US010569715B2

(12) United States Patent
 Clark

(10) Patent No.: US 10,569,715 B2
(45) Date of Patent: Feb. 25, 2020

(54) COLLAPSIBLE CARGO CARRIER

(71) Applicant: Jonathan Clark, Florence, SC (US)

(72) Inventor: Jonathan Clark, Florence, SC (US)

( * ) Notice: Subject to any disclaimer, the term of this patent is extended or adjusted under 35 U.S.C. 154(b) by 0 days.

(21) Appl. No.: 16/004,320

(22) Filed: Jun. 8, 2018

(65) Prior Publication Data
US 2019/0135189 A1    May 9, 2019

Related U.S. Application Data

(60) Provisional application No. 62/517,239, filed on Jun. 9, 2017.

(51) Int. Cl.
*B60R 9/06* (2006.01)
(52) U.S. Cl.
CPC .................... *B60R 9/06* (2013.01)
(58) Field of Classification Search
CPC ........................................... B60R 9/06
USPC ...................... 224/497–499, 534, 42.39, 568
See application file for complete search history.

(56) References Cited

U.S. PATENT DOCUMENTS

| | | | | |
|---|---|---|---|---|
| 1,150,106 A | * | 8/1915 | Ericson ................... | A47C 17/80 224/487 |
| 3,146,824 A | * | 9/1964 | Veilleux ................... | B60J 7/085 160/23.1 |
| 6,382,486 B1 | * | 5/2002 | Kretchman ............... | B60R 9/06 224/498 |
| 2003/0150893 A1 | * | 8/2003 | Deutchman ............. | B60R 11/06 224/410 |
| 2008/0142559 A1 | * | 6/2008 | Lim .......................... | B60R 9/06 224/489 |

* cited by examiner

*Primary Examiner* — Scott T McNurlen

(57) ABSTRACT

A collapsible cargo container comprises a frame that is attachable to a vehicle, a bed comprising a flexible material, and a spooling mechanism connected to the frame, the spooling mechanism comprising a rotatable bar connected to an end of the bed. When the collapsible cargo container is in an extended position, the bed is supported by the frame so that it can support cargo and when the collapsible cargo container is in a collapsed position, at least a portion of the bed is spooled around the rotatable bar.

19 Claims, 7 Drawing Sheets

COLLAPSIBLE CARGO CARRIER

PRIORITY

The present application claims the benefit of domestic priority based on U.S. Provisional Patent Application 62/517,239 filed on Jun. 9, 2017, the entirety of which is incorporated herein by reference.

BACKGROUND

For millennia, people have been searching for convenient ways to carry cargo. From nomads to pioneers to simple vacationers, easy and secure ways to transport belongings are difficult to come by. As Wallace Stegner quipped, "It's easier to die than to move . . . at least for the Other Side you don't need trunks."

In recent times, the carrying of cargo has been made somewhat easier with the advent of cargo carriers that are attachable to vehicles. The cargo carriers can be loaded on the top of or towed behind a vehicle. However, these carriers have several issues making them less than ideal. For example, conventional cargo carriers are large and cumbersome to store, transport, and install. Many cargo carriers protrude out from the vehicle and/or block access to the trunk or other parts of the vehicle, even when empty. In addition, conventional tow-behind cargo carriers can make parking and driving in reverse difficult.

Therefore, there is a need for an improved cargo carrier. Furthermore, there is a need for a cargo carrier that is collapsible and out of the way when not carrying cargo. Additionally, there is a need for a cargo carrier that is easy to install, remove, and store.

SUMMARY

The present invention satisfies these needs. In one aspect of the invention, a collapsible cargo carrier is provided.

In another aspect of the invention, a collapsible cargo carrier comprises a flexible bed and a spooling mechanism for spooling at least a portion of the bed.

In another aspect of the invention, a collapsible cargo container comprises a frame attachable to a vehicle, a bed comprising a flexible material, and a spooling mechanism connected to the frame, the spooling mechanism comprising a rotatable bar connected to an end of the bed, wherein when the collapsible cargo container is in an extended position, the bed is supported by the frame so that it can support cargo and when the collapsible cargo container is in a collapsed position, at least a portion of the bed is spooled around the rotatable bar.

In another aspect of the invention, a collapsible cargo container comprises a bumper of a vehicle and a frame integral with and permanently attached to the bumper; a bed comprising a flexible material; and a spooling mechanism comprising a rotatable bar connected to an end of the bed, wherein when the collapsible cargo container is in an extended position, the bed is supported by the frame so that it can support cargo and when the collapsible cargo container is in a collapsed position, at least a portion of the bed is spooled around the rotatable bar.

In another aspect of the invention, a method of transporting cargo comprises connecting a frame to a vehicle; supporting a bed within the frame when the bed is in an extended position where it can support cargo, the bed comprising a flexible material; and collapsing the bed by scrolling at least a portion of the bed on a rotatable bar connected to the frame.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a cargo carrier. In particular, the invention relates to a collapsible cargo carrier. Although the invention is illustrated and described in the context of being useful for towing cargo behind a vehicle, the present invention can be used in other ways, as would be readily apparent to those of ordinary skill in the art. Accordingly, the present invention should not be limited just to the examples and embodiments described herein.

Figure 1A:
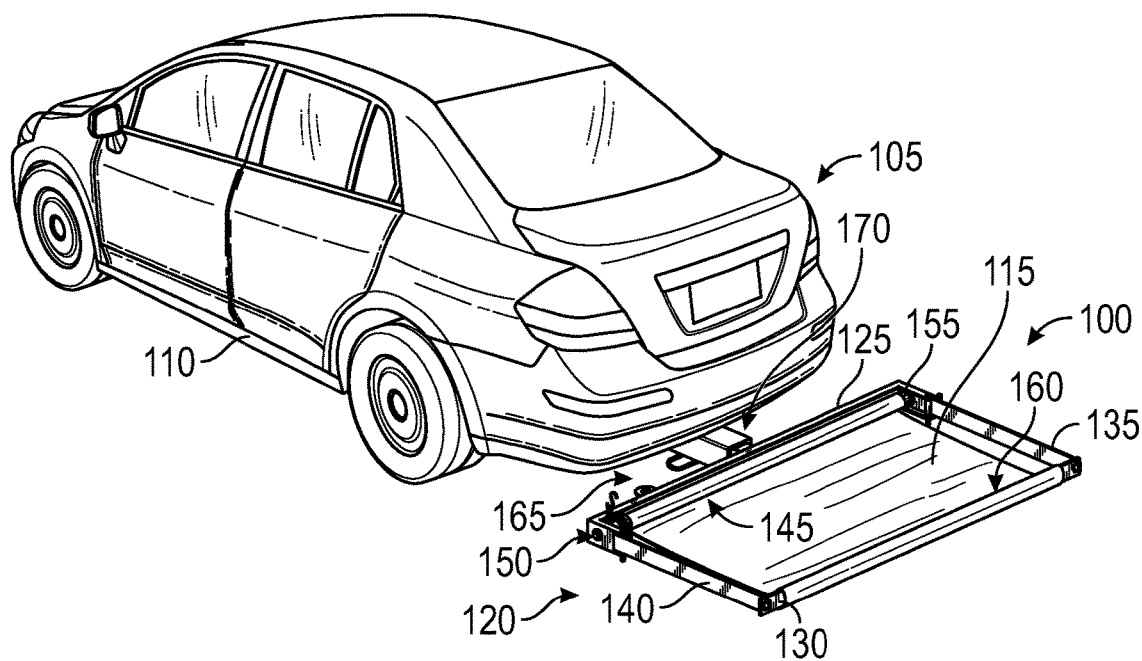
FIG. 1A is a schematic perspective view of a collapsible cargo carrier according to a version of the invention attached to a vehicle.

FIG. 1A shows a collapsible cargo carrier 100 according to one version of the invention. The collapsible cargo carrier 100 is connectable, either permanently or releasably, to the rear 105 of a vehicle 110. The vehicle 110 can be a car, truck, SUV, tractor, motorcycle, bicycle, or any other mode of transportation. The collapsible cargo carrier 100 includes a bed 115 sufficiently strong and sturdy to carry cargo in a secure manner. The bed 115 is supported by a frame 120 made up of a front support 125, a rear support 130, and a pair of side supports, a right side support 135 and a left side support 140. The frame 120 supports the bed 115 in the collapsible cargo carrier's extended position, as shown in FIG. 1A. In the extended position, the collapsible cargo carrier 100 is locked in a cargo-carrying configuration.

In one version, the bed 115 of the collapsible cargo carrier 100 is a flexible piece of a material that is capable of extending from the front support 125 to the rear support 130. The flexible fabric should be sufficiently strong to support at least about 100 pounds, more preferably at least about 300 pounds, and most preferably at least about 500 pounds when supported within the frame 120 in the extended position. The flexible material may comprise one or more of cotton, nylon, polypropylene, and the like, and in one particular version comprises canvas. The canvas can be solid fabric or can be made of straps or rope.

In the version shown in FIG. 1A, the bed 115 is attached at its front end 145 to a spool mechanism 150 associated with the front support 125. The spool mechanism 150 includes a rotatable bar 155 affixed to the front end 145 of the bed 115. By rotation of the rotatable bar 155, the bed 115 can be spooled around the rotatable bar 155. In this version, the rear end 160 of the bed 115 is affixed to the rear support 130. Accordingly, as the rear support 130 is moved away from the front support 125, the bed 115 is unspooled from the rotatable bar 155 and the bed is extended. When the rear support 130 is moved towards the front support 125, the bed 115 can be spooled around the rotatable bar 155 and the bed 115 can be collapsed. The collapsible cargo carrier 100 is shown in a collapsed position in FIG. 1B. The rear end 160 of the bed can be attached to the rear support 130 in any manner. For example, the rear end of the bed 115 can be wrapped around the rear support 130 and attached to itself or the rear support 130 by sewing, adhesive, or the like. The length of the material of the bed 115 from front end 145 to rear end 160 may selected to be approximately the distance of the rear support 130 to the front support 125 when in the extended position. In one version, the length can be selected so that the bed 115 is in a state of tension when in the extended position. In another version, the bed 115 has a little slack in the extended position so that the cargo sits slightly below the frame 120.

Variations of the collapsible cargo carrier 100 shown are possible. For example, alternatively or addition, the spooling mechanism 150 can be associated with the rear support 130. In another version, the spooling mechanism 150 can be replaced with a different type of mechanism, such as a mechanism that allows the material of the bed 115 to fold over itself. In yet another version, the spooling mechanism can be removed and the bed 115 can be a replaceable piece of bed material.

Figure 1B:
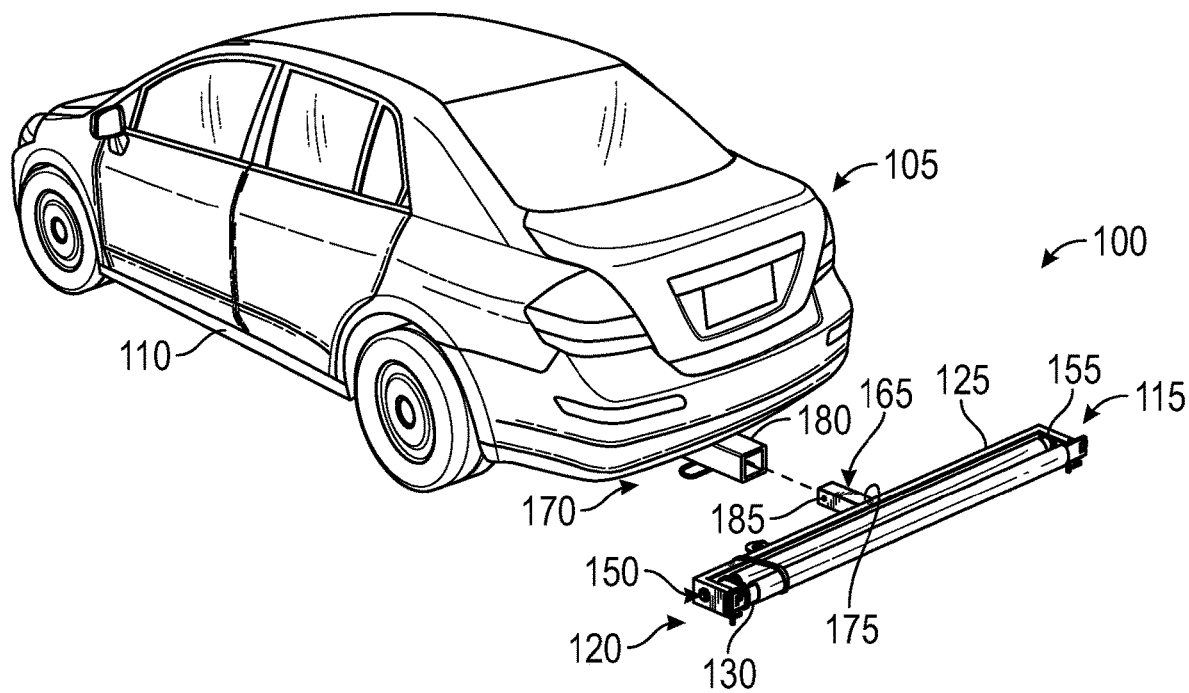
FIG. 1B is a schematic, exploded, perspective view of the collapsible cargo carrier of FIG. 1A in a collapsed position.

As also shown in FIGS. 1A and 1B, the collapsible cargo carrier 100 can be removably connectable to the vehicle 110 by a connection mechanism 165. For example, the collapsible cargo carrier 100 can be configured to be connectable to a vehicle's standard tow hitch 170. In this version, the frame 120 of the collapsible cargo carrier 100 can include or be attachable to a hitch insert 175 that is insertable into the vehicle's female hitch receiver 180. A hitch pin aperture 185 can be provided to help secure the hitch insert 175 in the hitch receiver 180 with, for example, a cotter pin or the like. Alternatively, a different type of connection mechanism can be employed, and/or the collapsible cargo carrier 100 can be connected to a different portion of the vehicle 110.

The collapsible cargo carrier 100 can be lockable in the extended position and/or the collapsed position. When locked in the extended position and connected to the vehicle 110, the collapsible cargo carrier 100 can be used to carry cargo on the bed 115 so that the cargo can be towed by the vehicle 110. When locked in the collapsed position, the collapsible cargo carrier 100 can securely be towed by the vehicle 110 in an unencumbering and out-of-the-way manner. The collapsible cargo carrier 100 can then be moved and locked in the extended position for subsequent carrying of cargo. The collapsed position is also convenient for carrying, installing, removal, and storage of the collapsible cargo carrier 100 when it is disconnected from the vehicle 110.

Figure 2A:
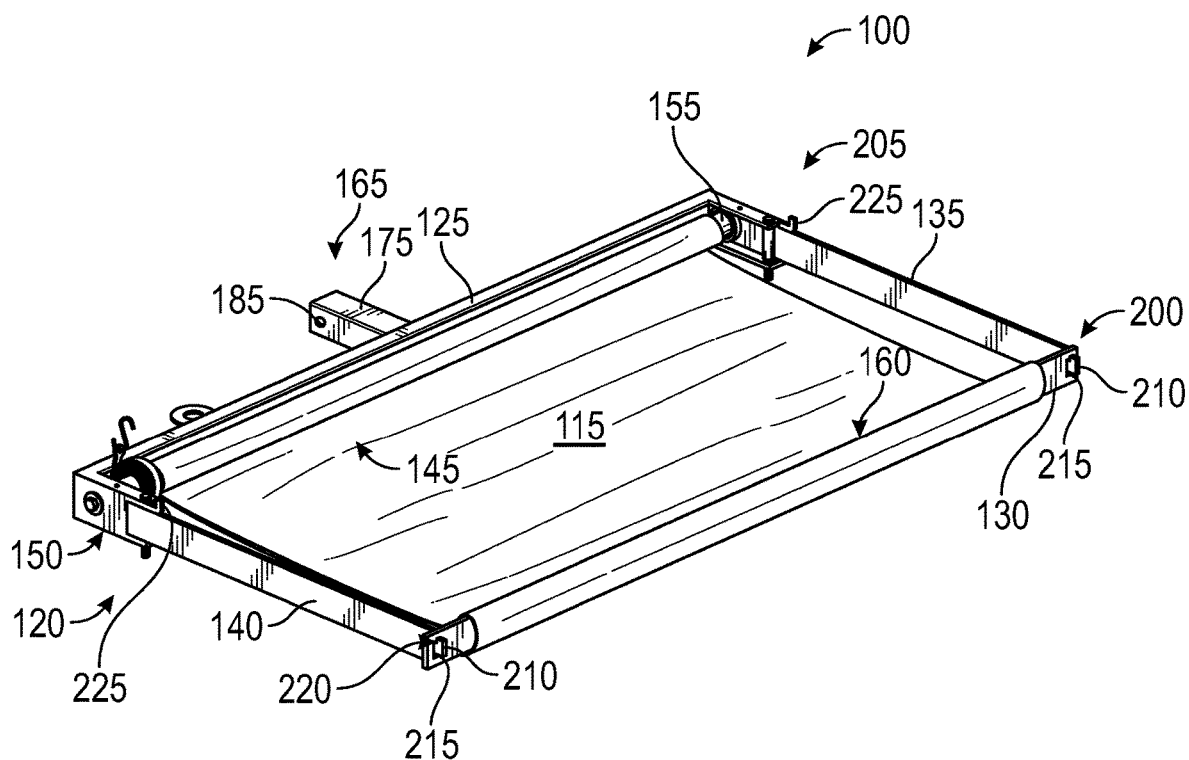
FIG. 2A is a schematic perspective view of a version of the collapsible cargo carrier of the invention in an extended position.
Figure 2B:
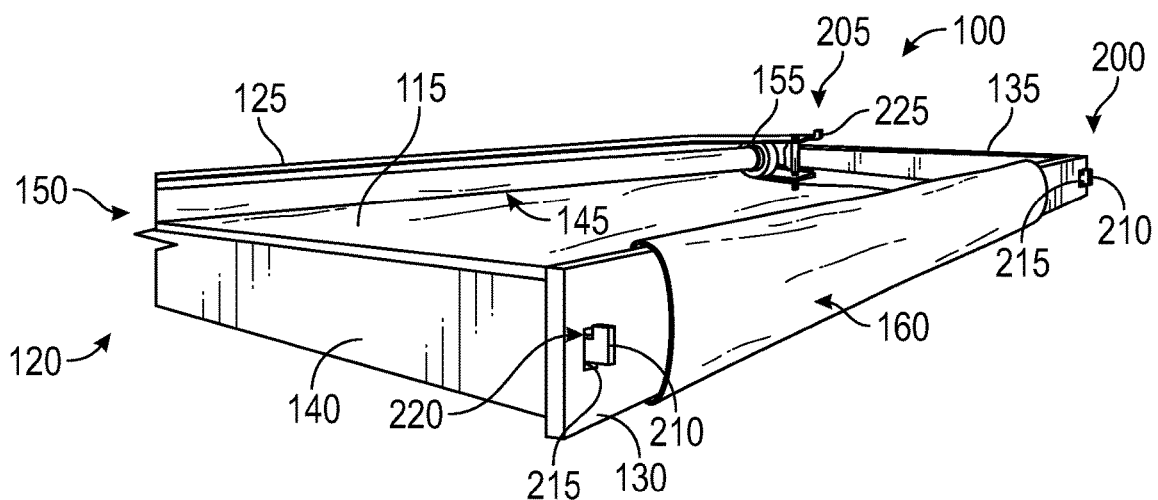
FIG. 2B is a schematic perspective view of a close up portion of the collapsible cargo carrier of FIG. 2A.

FIGS. 2A and 2B show a version of an extended position locking mechanism 200 and a collapsed position locking mechanism 205 of the collapsible cargo carrier 100. The extended position locking mechanism 200 includes a hook 210 located on the rear end of the side supports 135, 140. The hooks 210 are insertable into slots 215 respectively positioned on the left and rights sides of the rear support 130. The hooks 210 each include a notch 220 that receives the rear support 130 and prevents movement of the rear support 130 towards or away from the front support 125. In the extended position, the side supports 135, 140 are rigidly connected to the front support 125, and when the rear support 130 is positioned on the hooks 210, a stable rectangular frame is constructed. To unlock the collapsible cargo carrier 100 from the extended position, the rear support 130 is lifted up and removed from the hooks 210 so that it is free to move towards or away from the front support 125. The collapsible cargo carrier 100 is also lockable in its collapsed position by the collapsed position locking mechanism 205. The collapsed position locking mechanism 205 includes a pair of hooks 225 positioned on or associated with the front support 125. The front support hooks 225 are also receivable within the slots 215 of the rear support 130 so that when the bed 115 is collapsed, the rear support 130 may be locked and connected to the front support 125. In the collapsed position, the frame 120 thus forms another rigid rectangular configuration but without the side supports 135, 140. Alternative connection and locking mechanisms can be provided.

Figure 3A:
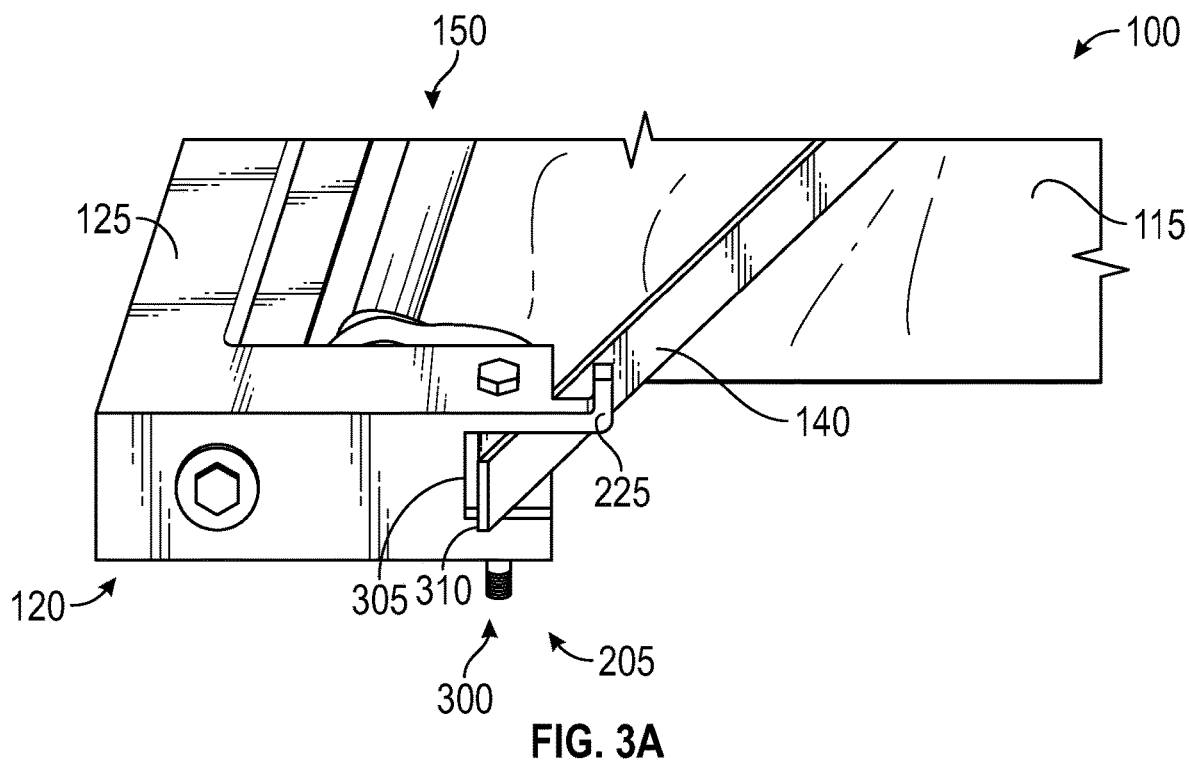
FIG. 3A is a schematic perspective view of a portion of the collapsible cargo carrier in an unlocked position.
Figure 3B:
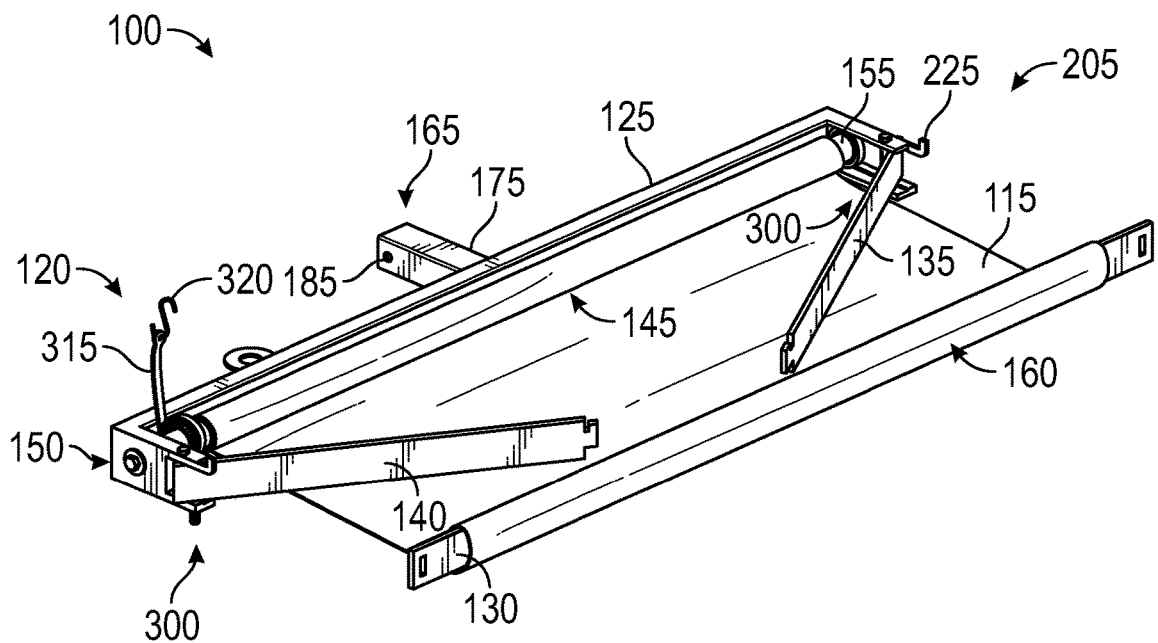
FIG. 3B is another schematic perspective view of the collapsible cargo carrier of FIG. 3A.

The side supports 135, 140 can be removably attachable to the front support 125 and the rear support 130 or can be designed to remain attached to the frame 120 and to be collapsible when the collapsible cargo carrier 100 is moved to the collapsed position. A version of collapsible side supports 135, 140 is shown in FIGS. 3A and 3B. In this version, the side supports 135, 140 are rotatable inwardly relative to the front support 125. Each side support 135, 140 is connected to the front support 125 by a hinge mechanism 300 that allows each side support 135, 140 to rotate at least 90 degrees relative to the front support 125. Accordingly, the side supports 135, 140 can be moved to a position where they are at substantially a right angle with the front support 125 and can be locked in this position by the rear support 135 by the extended position locking mechanism 200. When unlocked, the side supports 135, 140 can be rotated inwardly to allow the rear support 135 and the bed 115 to be moved to the collapsed position with the side supports 135, 140 positioned between the rear support 130 and the front support 125 and being substantially parallel thereto. Optionally, the hinge mechanisms 300 can include an abutment 305 that contacts a forward end 310 of the side supports 135, 140 to prevent the side supports 135, 140 from rotating outwardly more than about 90 degrees from the front support 125. The prevention of external rotation would prevent the rear support 130 from swaying back and forth and would maintain the frame 120 as a rectangle rather than allowing it to be a non-rectangular parallelogram. Alternatively, in place of the abutments 305, cross cables of the like could be provided to prevent the external rotation. In another version, the side supports 135,140 can be pivotally attached to the rear support 130 instead of or in addition to the front support 125. In yet another version, one of the side supports can be pivotally connected to the front support 125 and the other can be pivotally connected to the rear support 130.

Figure 3C:
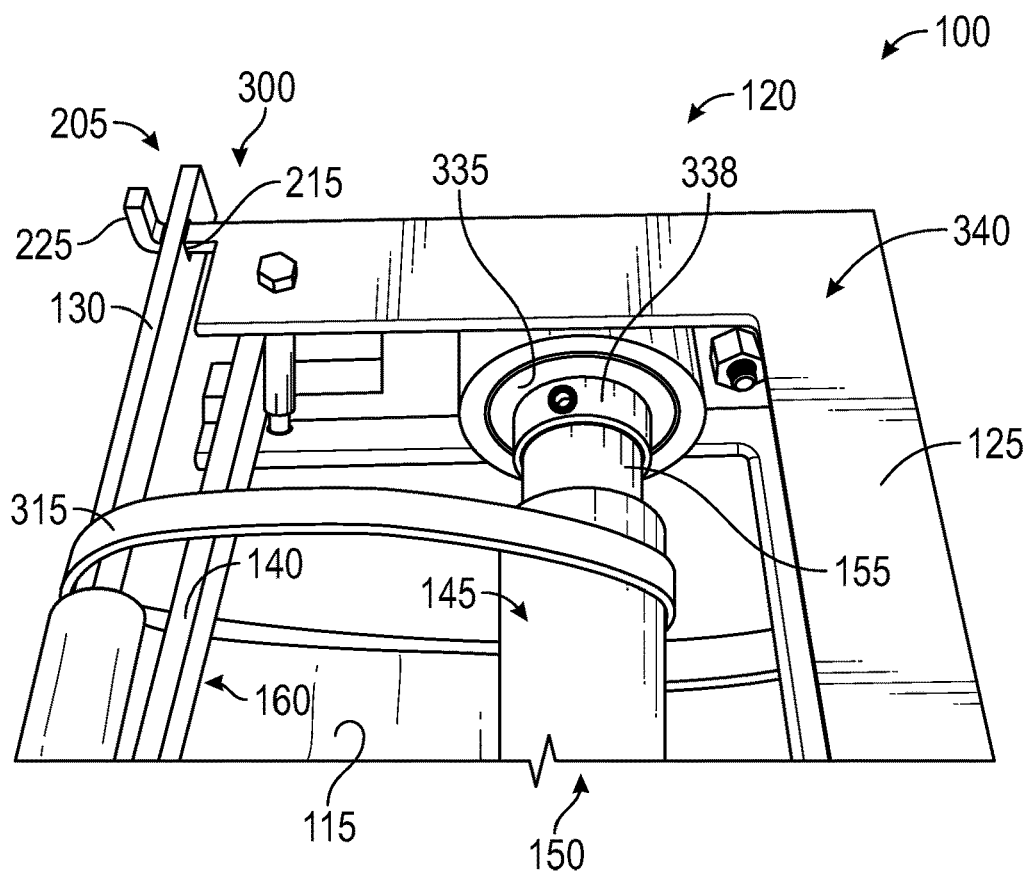
FIG. 3C is a schematic perspective view from above and to the side of a version of the spooling mechanism and transition cord of the collapsible cargo carrier in the collapsed position.
Figure 3D:
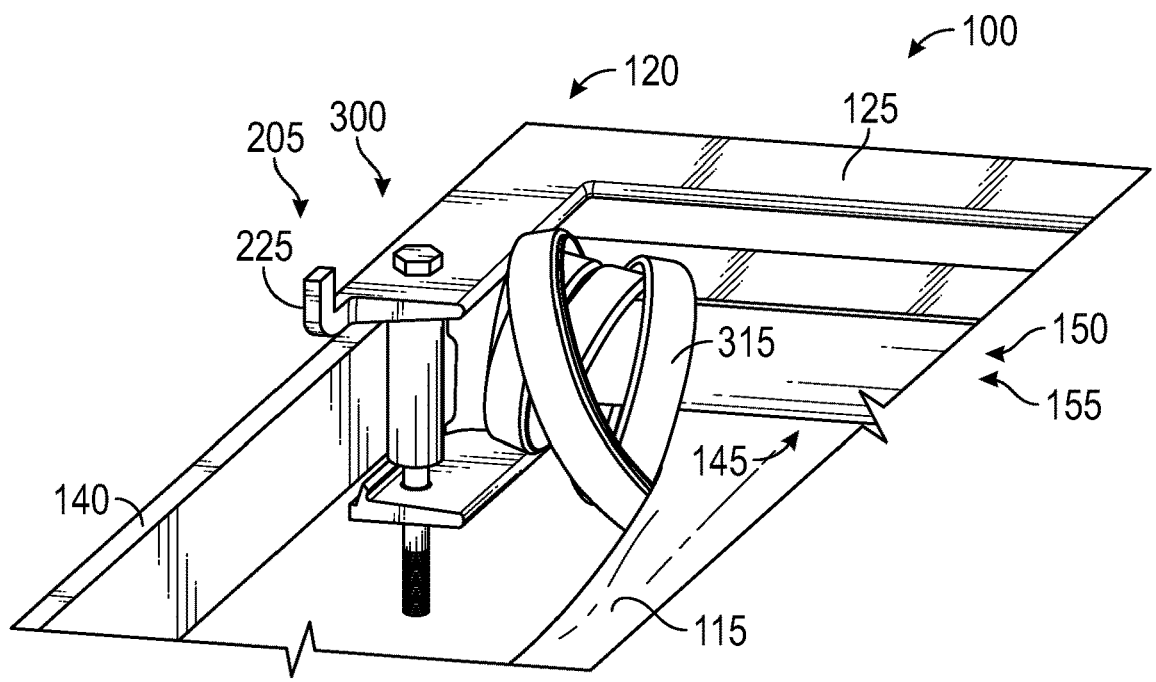
FIG. 3D is a schematic perspective view from above and the rear of a version of the spooling mechanism and transition cord of the collapsible cargo carrier in the extended position.

Movement of the collapsible cargo carrier 100 from the extended position to the collapsed position can be facilitated by a transition cord 315, as shown in FIG. 3B through 3D. In particular the transition cord 315 can be used to help spool the bed onto the rotatable bar 155. The transition cord 315 is wrapped around the rotatable bar 155 in the opposite direction as the bed 115, as shown in FIGS. 3B and 3D so that in the extended position, the transition cord 315 is mostly wrapped around the rotatable bar 155. When the transition cord 315 is pulled, it causes the rotatable bar 155 to rotate in a direction that will take up and spool the bed 115 until the collapsible cargo carrier 100 reaches its collapsed position, as shown in FIG. 3C. In the collapsed position, the collapsed position locking mechanism 205 can be engaged. When in the collapsed position and with the bed 115 spooled around the rotatable bar 155, the transition cord 315 will be in an extended position where it is mostly unwrapped from the rotatable bar 155. Alternatively, the transition cord 315 can be replaced or supplemented with a knob that extends from the frame 120 and is associated with the rotatable bar 155 to help turn the rotatable bar 155.

Figure 4A:
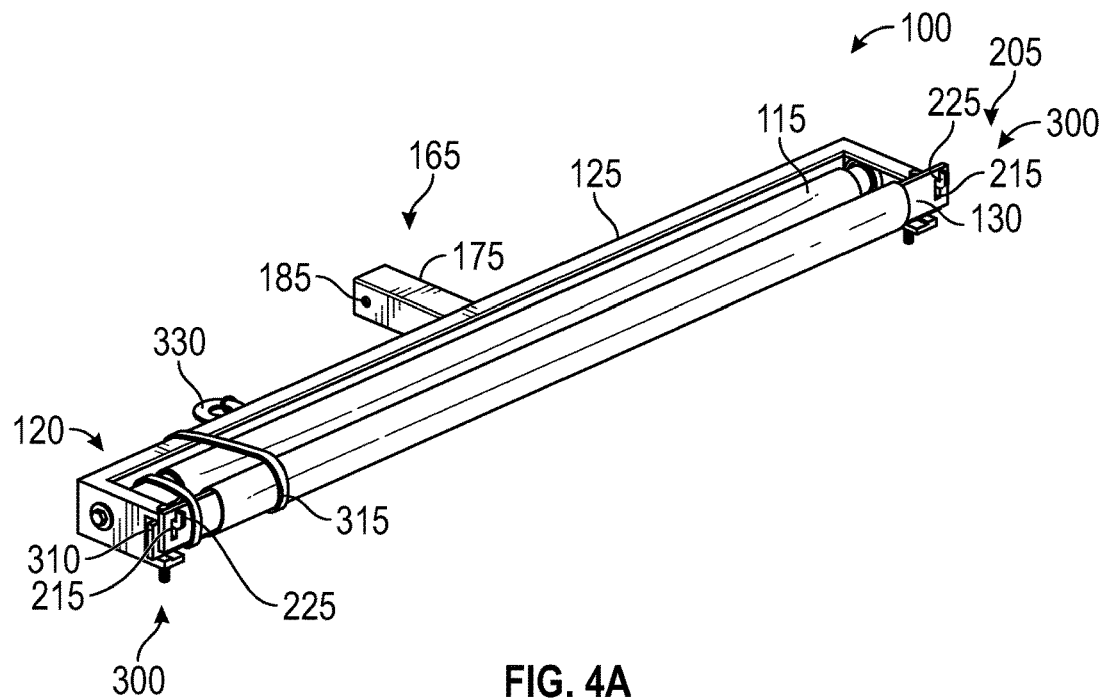
FIG. 4A is a schematic perspective view from above and the rear of a version of the collapsible cargo carrier in a collapsed position.
Figure 4B:
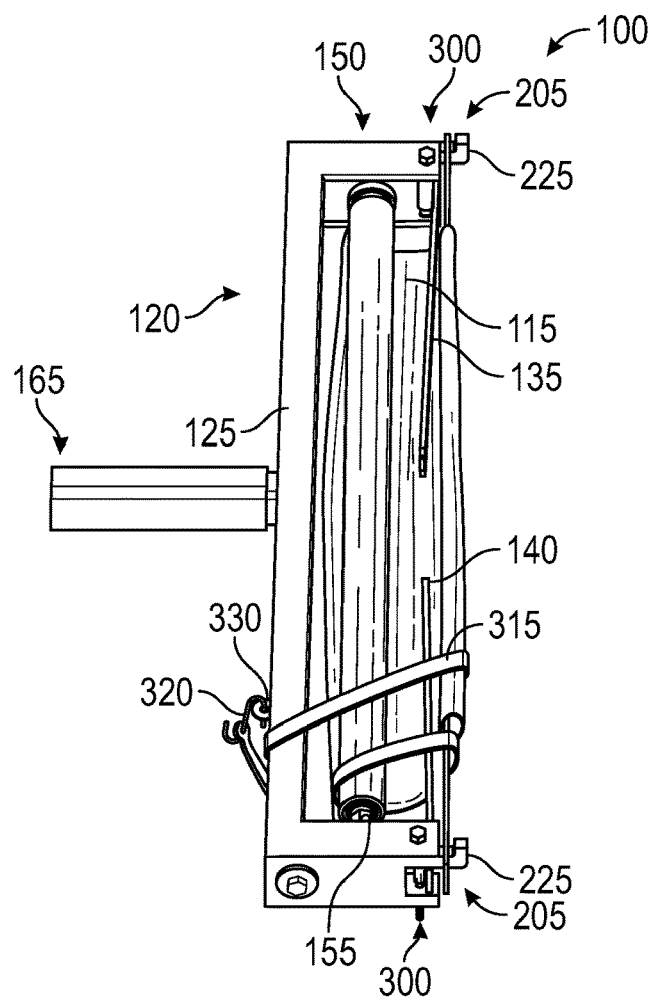
FIG. 4B is a schematic perspective view from above and to the side of the collapsible cargo carrier of FIG. 4A.

To further secure the collapsible cargo carrier 100 in the collapsed position, the transition cord 315 can be wrapped around the rear support 130 and the front support 125, as shown in FIGS. 4A and 4B. A hook 320 can be provided on the end of the transition cord 315, and the hook can insertable into a loop 330 on the frame 120 to help keep the transition cord 315 around the front support 125 and the rear support 130. The transition cord can be made of rubber, steel, plastic, and/or nylon rope. Alternatively, the hook 325 and/or the loop 330 can be removed and the transition cord 315 can be otherwise secured or tied.

In one version, as shown in FIG. 3C, the collapsible cargo carrier 100 can include a tension mechanism 340. The tension mechanism 340 includes a bushing 338 and a tension module 335 such as a recoil spring. The tension module 335 may be used to recoil the bed 115 onto the rotatable bar 155 whenever the frame 120 is unlocked from the extended position.

Figure 5A:
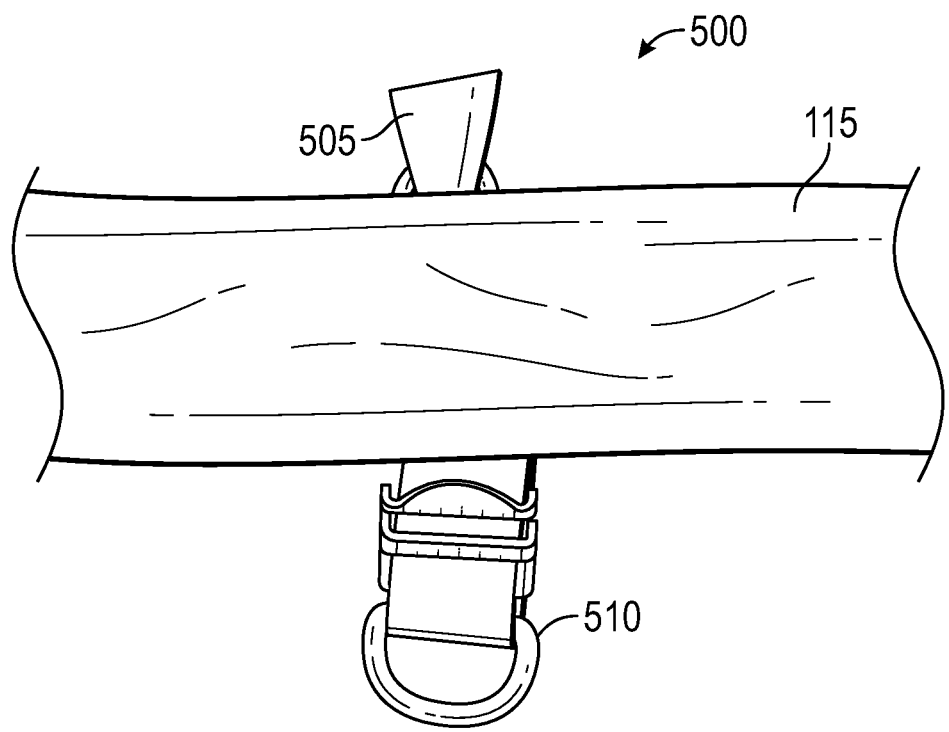
FIG. 5A is a schematic front view of a version of collapsible cargo carrier with a built-in strap.
Figure 5B:
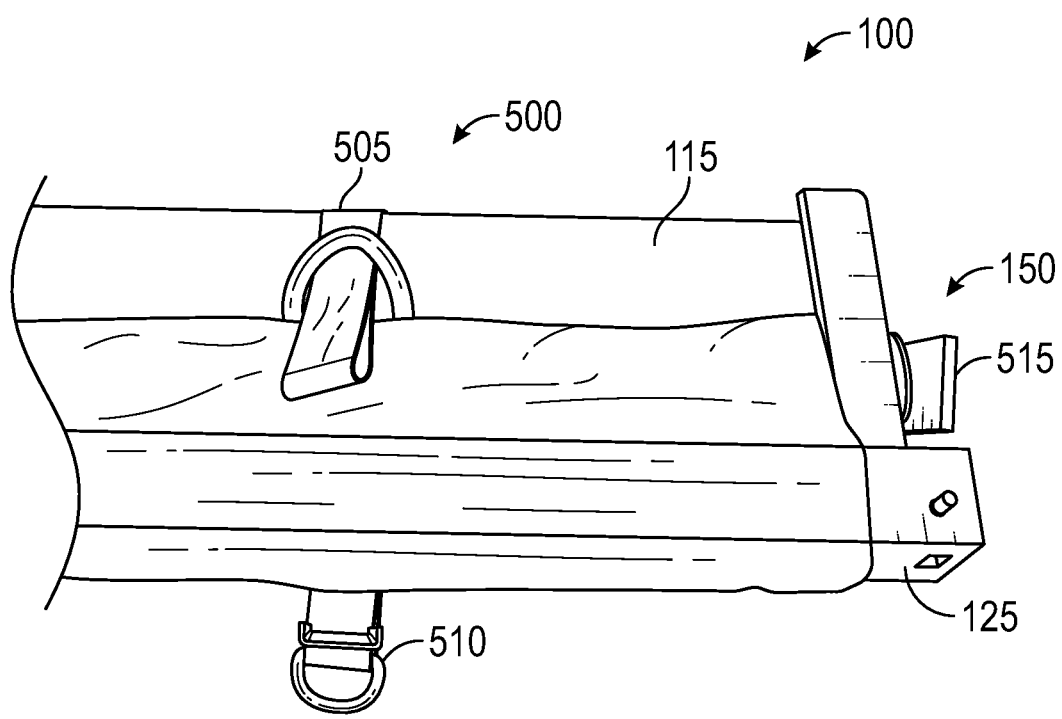
FIG. 5B is a schematic perspective view of the strap of FIG. 5A in use.

FIG. 5A shows a version of a collapsible cargo carrier 100 with one or more straps 500 that can be separate from or built into the fabric of the bed 115. The straps 500 include a piece of material 505 sewn to itself to form a loop. It may also include hardware such as a ring 510 or strap adjuster to facilitate connecting ropes, straps, or bungee cords to help secure cargo on the bed 115. Alternatively, one or more bungee cords or nylon straps can be attached to the loops 510. FIG. 5B shows the straps 500 wrapped around the frame 120. Also shown in FIG. 5B is a knob 515 that can optionally be provided to rotate the rotatably bar 150 of the spooling mechanism 150.

Figure 6A:
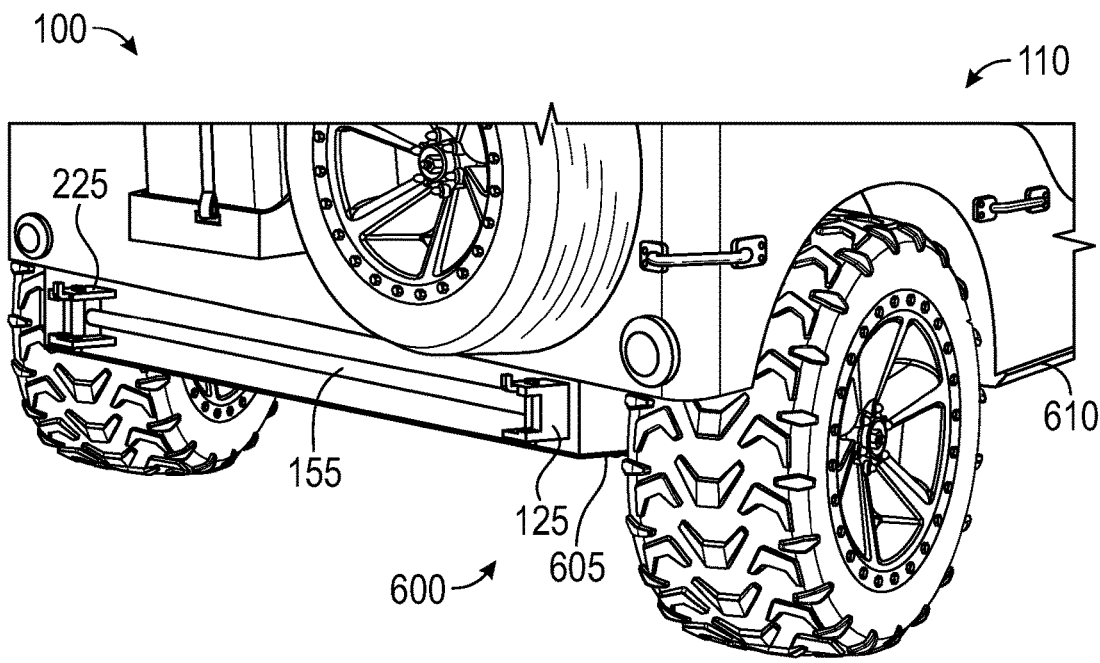
FIG. 6A is a schematic perspective view of a collapsible cargo carrier according to one version of the invention integrated with a bumper of an SUV.
Figure 6B:
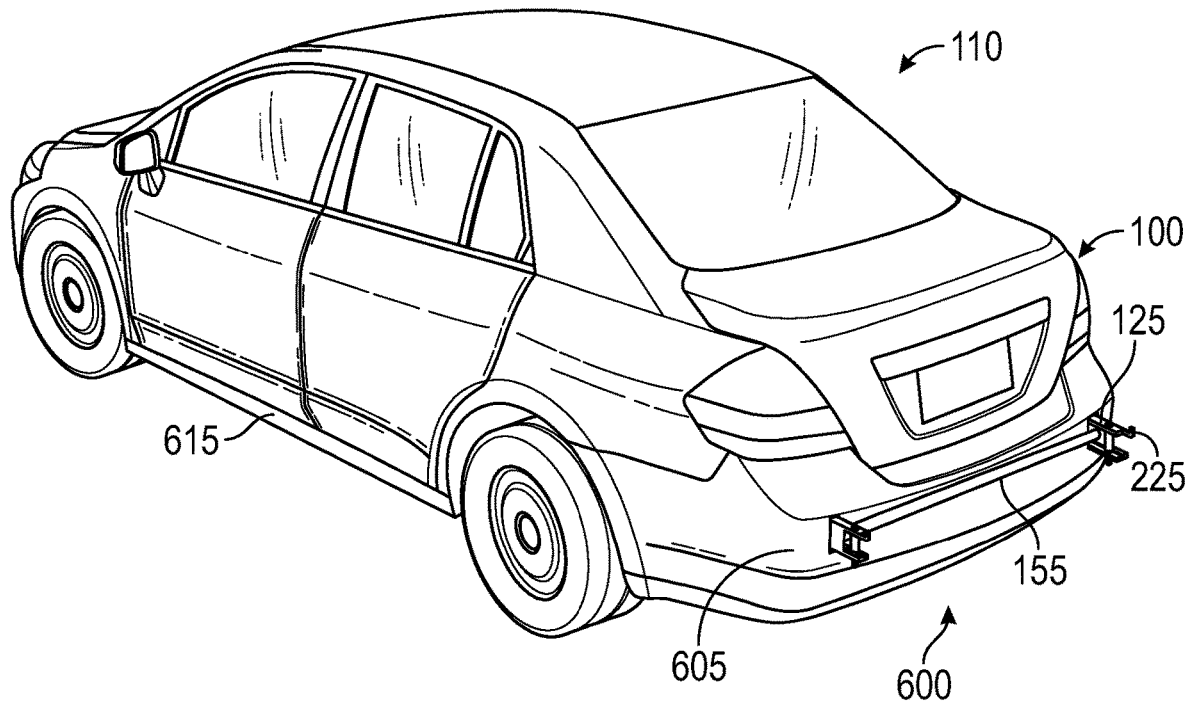
FIG. 6B is a schematic perspective view of a collapsible cargo carrier according to one version of the invention integrated with a bumper of an automobile.

Another version of a collapsible cargo carrier 100 is shown in FIGS. 6A and 6B. In this version, the collapsible cargo carrier 100 comprises an integrated collapsible cargo carrier 600 where the collapsible cargo carrier 100 is an integral part of the vehicle 110 and is permanently affixed thereto rather than being removably connectable. In the version of FIG. 6A, the collapsible cargo carrier 100 is integrated into the bumper 605 of an SUV 610. In FIG. 6B, the collapsible cargo carrier 100 is integrated into the bumper 605 of a non-SUV automobile 615. In this version, the front support 125 is rigidly affixed to the bumper 605 or other part of the vehicle 110. The rest of the collapsible cargo carrier 100 is as discussed above. In FIGS. 6A and 6B, the bed 115, the rear support 130, and the side supports 135, 140 have been removed for clarity. In one version, the entire collapsible cargo carrier 100 can be contained within the bumper 605 so that it is out of sight when in the collapsed position. The rear surface of the rear support 130 can serve as the exterior of the bumper 605.

Additional modification of the collapsible cargo carrier 100 are possible. For example, in one version of the invention, the spooling mechanism 150 can be connected to or otherwise associated with the rear support 130. In this version, the front end 145 of the bed 115 is attached to the front support 125, and the rear end 160 of the bed 115 is attached to the spooling mechanism 150. In yet another version, the spooling mechanism 150 can comprise a spool connected to the front support 125 and a spool connected to the rear support 130.

Positional variations of the collapsible cargo carrier 100 are also possible. For example, the collapsible cargo carrier 100 can be connectable to the front of a vehicle. In this version, the positional terminology herein would be reversed to match the orientation of the vehicle. So, for example, the front support would be a rear support.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

What is claimed is:

1. A collapsible cargo container comprising:
a frame attachable to a vehicle, the frame comprising a front support, a rear support, and side supports, the side supports being pivotable relative to the front support;
a bed comprising a flexible material; and
a spooling mechanism connected to the front support, the spooling mechanism comprising a rotatable bar connected to an end of the bed, wherein the rear support is connected to another end of the bed, wherein movement of the rear support relative to the front support causes rotation of the rotatable bar, and wherein the side supports are not connected to the bed;
wherein when the collapsible cargo container is in an extended position, the bed is supported by the frame so that it can support cargo and when the collapsible cargo container is in a collapsed position, at least a portion of the bed is spooled around the rotatable bar.

2. A collapsible cargo container according to claim 1 wherein the frame is substantially rectangular when the collapsible cargo carrier is in the extended position.

3. A collapsible cargo container according to claim 1 wherein the frame is collapsible when the collapsible cargo carrier is in the collapsed position.

4. A collapsible cargo container according to claim 1 wherein the side supports pivot inwardly when the collapsible cargo carrier is being moved from the extended position to the collapsed position.

5. A collapsible cargo container according to claim 1 further comprising a locking mechanism to lock the frame in the extended position.

6. A collapsible cargo container according to claim 1 further comprising a locking mechanism to lock the frame in the collapsed position.

7. A collapsible cargo container according to claim 1 wherein the rear support can move towards and away from the front support as the bed is spooled or unspooled.

8. A collapsible cargo container according to claim 1 further comprising a transition cord that can be wrapped around the rotatable bar in a direction opposite to the bed so it can be used to rotate the rotatable bar.

9. A collapsible cargo container according to claim 1 wherein the bed comprises built-in straps to help secure cargo.

10. A collapsible cargo container according to claim 1 wherein the frame is releasably attachable to a hitch mechanism of the vehicle.

11. A collapsible cargo container according to claim 1 wherein the frame is integral with and permanently affixed to a part of the vehicle.

12. A collapsible cargo container according to claim 1 wherein the frame is attachable to the rear of the vehicle.

13. A collapsible cargo container according to claim 1 wherein the frame is an integral part of
a bumper of a vehicle.

14. A method of transporting cargo, the method comprising:
  connecting a frame to a vehicle, the frame comprising a front support, a rear support, and side supports, the side supports being pivotable relative to the front support;
  supporting a bed within the frame when the bed is in an extended position where it can support cargo, the bed comprising a flexible material; and
  collapsing the bed by scrolling at least a portion of the bed on a rotatable bar connected to the frame while collapsing the bed.

15. A method according to claim 14 further comprising locking the frame in the extended position.

16. A collapsible cargo container comprising:
  a frame attachable to a vehicle, the frame comprising a front support, a rear support, and side supports, the side supports being pivotable relative to the front support;
  a bed comprising a flexible material; and
  a spooling mechanism connected to the rear support, the spooling mechanism comprising a rotatable bar connected to an end of the bed, wherein the front support is connected to another end of the bed, wherein movement of the rear support relative to the front support causes rotation of the rotatable bar, and wherein the side supports are not connected to the bed;
  wherein when the collapsible cargo container is in an extended position, the bed is supported by the frame so that it can support cargo and when the collapsible cargo container is in a collapsed position, at least a portion of the bed is spooled around the rotatable bar.

17. A collapsible cargo container according to claim 16 further comprising a locking mechanism to lock the frame in the extended position.

18. A collapsible cargo container according to claim 16 further comprising a locking mechanism to lock the frame in the collapsed position.

19. A collapsible cargo container according to claim 16 wherein the rear support can move towards and away from the front support as the bed is spooled or unspooled.

* * * * *